Figure 1:
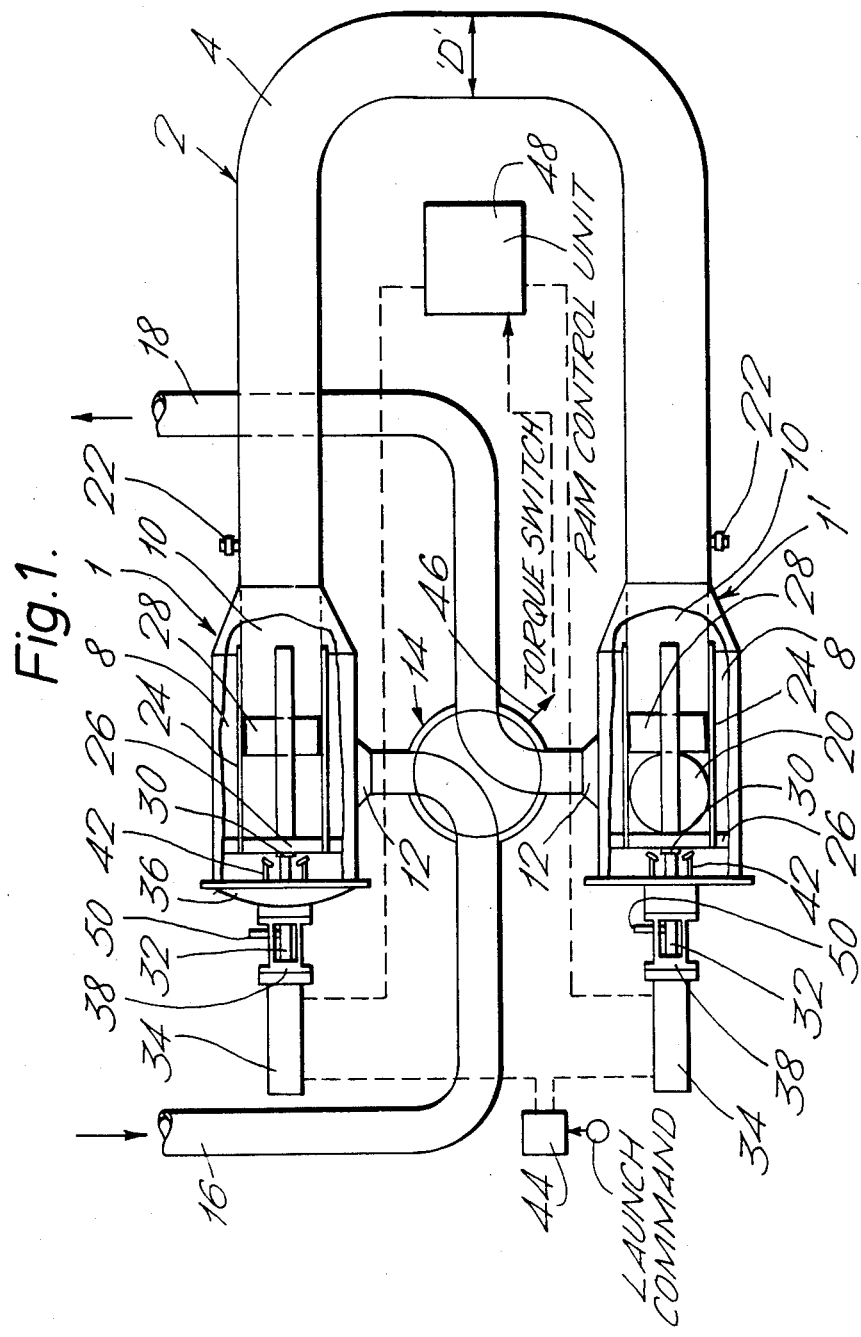

United States Patent [19]
Elderfield et al.

[11] 4,175,421
[45] Nov. 27, 1979

[54] METER PROVERS

[75] Inventors: Kenneth J. Elderfield, Caythorpe; Charles Griffiths, Wokingham, both of England

[73] Assignee: National Carbonising Company Limited, London, England

[21] Appl. No.: 919,853

[22] Filed: Jun. 28, 1978

[30] Foreign Application Priority Data

Jul. 29, 1977 [GB] United Kingdom ............... 32066/77

[51] Int. Cl.² .............................................. G01F 25/00
[52] U.S. Cl. ........................................................ 73/3
[58] Field of Search ............................. 73/3; 137/268

[56] References Cited

U.S. PATENT DOCUMENTS

| | | | |
|---|---|---|---|
| 3,186,014 | 6/1965 | Allen | 73/3 X |
| 3,504,523 | 4/1970 | Layhe | 137/268 X |
| 3,638,475 | 2/1972 | Grove et al. | 73/3 |
| 3,720,089 | 3/1973 | Davis et al. | 73/3 |
| 3,783,248 | 1/1974 | Sugden, Jr. | 73/3 |
| 3,800,587 | 4/1974 | Clinton | 73/3 |
| 3,978,708 | 9/1976 | Hayward | 73/3 |

Primary Examiner—Daniel M. Yasich
Attorney, Agent, or Firm—Rose & Edell

[57] ABSTRACT

A meter prover is provided in which a substantially spherical plug travels through a U-shaped calibration conduit between two delivery/receiving stations at the ends of the conduit, and each said station contains means for selectively retaining the plug in the station. The retaining means consists of a sleeve with the same cross-section as the conduit which is mounted for horizontal movement toward and away from the conduit end along a plug cage that receives and guides the plug when it emerges from the conduit end. When the sleeve is in a position where it forms a continuation of the conduit end, fluid pressure is able to force the plug through the sleeve into the conduit, but when the sleeve and plug are spaced from the conduit end the fluid is able to bypass the plug and flow directly into the conduit.

7 Claims, 7 Drawing Figures

FLOW DIRECTION 'B'

FLOW DIRECTION 'C'

FLOW DIRECTION 'D'

FLOW DIRECTION 'E'

METER PROVERS

This invention relates to apparatus for calibrating or checking the calibration of flow meters in pipe lines, of the type commonly known as meter proving apparatus.

Inferential flow meters are commonly used to determine the flow rate of fluid through pipe lines. In some areas of this art, e.g. in the measurement of flow in oil lines, it is necessary to provide accurate measurements of this flow rate, and the flow meters used suffer from the disadvantage that their accuracy is affected by changes in viscosity, pressure and temperature of the fluid, general wear, etc. It is therefore essential periodically to check the calibration of the meters, and this is done by using meter provers (hereinafter referred to as "meter provers of the type described") comprising a calibration conduit of known volume connected at each end to an end station, valve means being provided selectively to connect the end stations and conduit in series with the main pipe line. A preferably spherical plug is initially located in one of the end stations and when the fluid is allowed to flow along the conduit the plug is carried around the conduit to the other end station. Two detectors, each located toward one end of the conduit, provide signals when the plug passes so that the interval between received signals (i.e. the time for the plug to travel along the conduit) can be determined and used to calculate the actual flow rate of the fluid. The valve means can be operated to reverse the connections to the main pipe line so that the measurement can be taken with the plug travelling in the opposite direction.

One problem associated with these meters is that the calibration conduit must be fairly large to provide a long calibration length for accuracy. Additionally, the reversal of the flow in the conduit takes a fairly long time, and in the meantime the rate of flow is less than that in the pipe line. Thus, the initial travelling time of the plug while the flow rate is low should be ignored, and each detector is therefore located at a distance from the end station, so that extra lengths of the conduit between the detectors and their associated end stations are required. These large conduit lengths can be very inconvenient, particularly if space is limited, as on offshore platforms.

In accordance with the invention, a meter prover is provided with a plug delivery/receiving station in which the plug travel is horizontal and which includes means for selectively retaining the plug in the station. The plug can thereby be prevented from travelling along the calibration conduit until the full flow of the fluid is established in the conduit, thus obviating the need for the extra length of conduit between the station and a detector.

The invention also extends to a meter prover comprising a calibration conduit having at each end a plug delivery/receiving station in which the plug travel is horizontal and which includes means for selectively retaining the plug in the station, and to a method of calibrating a meter using such a meter prover.

In a preferred embodiment of the invention, the plug delivery/receiving station comprises a horizontal chamber having a first port which is adapted to be connected to one end of the calibration conduit, and a second port adapted to be connected via the valve means to the main pipe line, the chamber containing a sleeve having a cross-sectional area corresponding to that of the calibration conduit, means being provided to move the sleeve in the axial direction of the end of the conduit between a first position in which the sleeve forms an extension of the conduit and a second position in which there is a space between the end of the conduit and the sleeve.

When the station is to receive the plug the sleeve is kept in the first position. The plug, which has a diameter substantially equal to that of the conduit and is preferably an interference fit therein, travels through the conduit and then through the sleeve. After the plug emerges from the sleeve, the fluid can travel outwardly from the end of the sleeve into the rest of the chamber and then through the second port, so that the thrust on the plug is substantially reduced. The overall density of the plug is substantially the same as that of the fluid so that it is effectively weightless when immersed, and hence the plug decelerates very quickly, and there is no potentially deleterious impact.

For operation in the reverse mode, the valve means is actuated to reverse the connections to the main pipe line, and at the same time the sleeve is moved to its second position, so that the fluid can flow freely from between the end of the conduit and the sleeve outwardly into the rest of the chamber and through the second port. In its second position the sleeve surrounds at least part of the plug, so that there is contact around the whole inner circumference of the sleeve, and no flow of fluid through the sleeve.

The sleeve is held in this position, in which the plug cannot be launched, until the valve means has completed its operation. The sleeve is then returned to its first position, drawing the plug with it, and the gap between the sleeve and the conduit closes. Fluid pressure is thus increasingly applied to the side of the plug facing away from the conduit and the plug is thereby launched.

In the prior art, the chamber of the station was generally of larger diameter than that of the conduit, and was either inclined at an angle or vertical and there was a possibility that the plug would not be launched at all if it engaged a shoulder between the conduit and the chamber and the flow rate was relatively low. However, the above-described arrangement obviates this disadvantage, and ensures that the plug is launched at the correct time.

Figure 2:
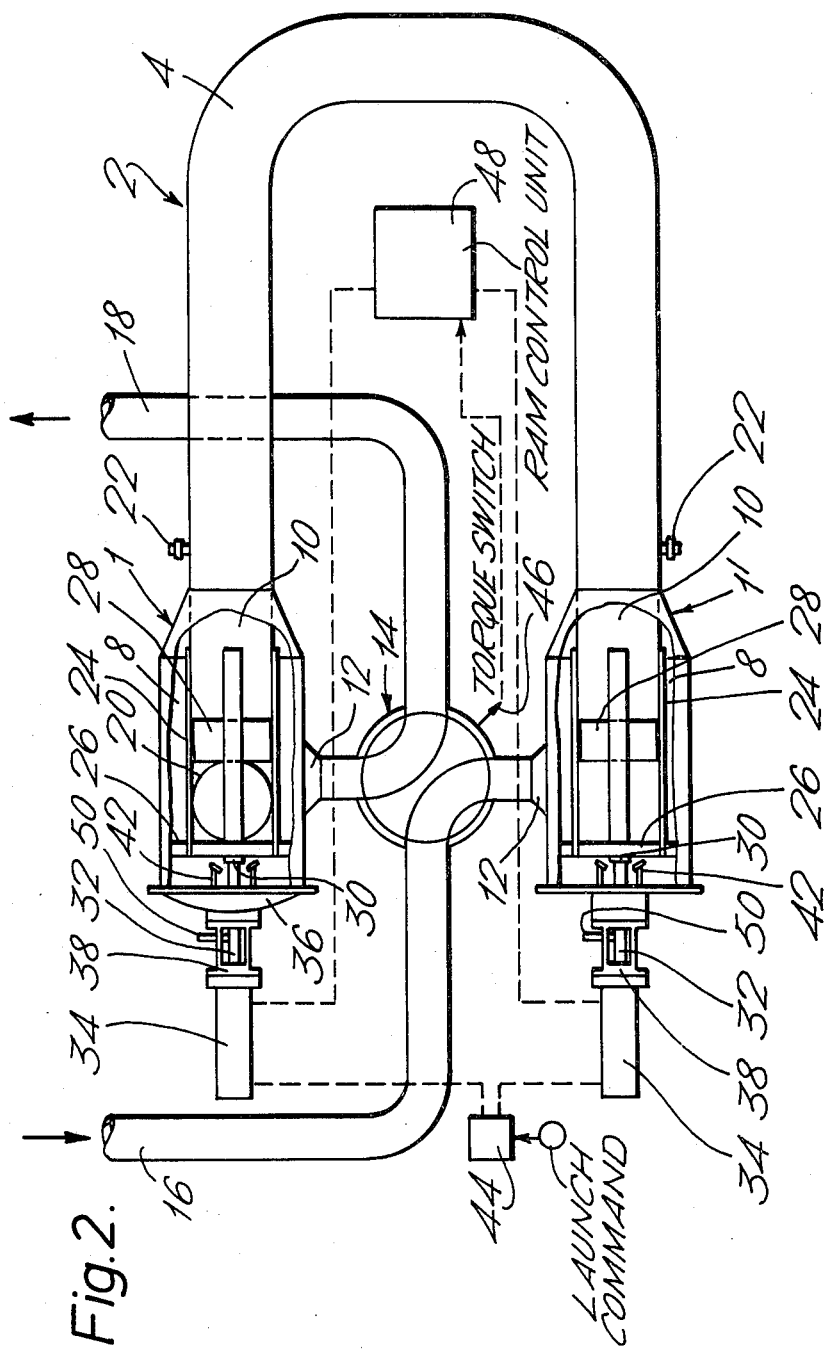
Figure 3:
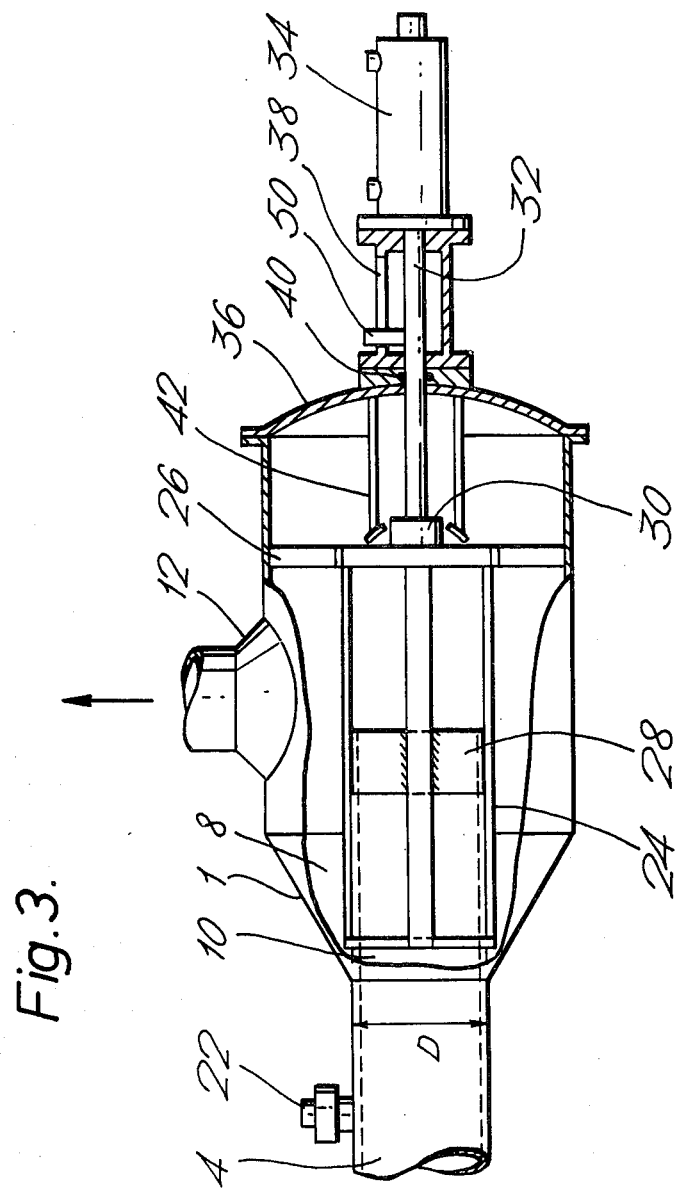

An arrangement embodying the invention will now be described by way of example, with reference to the accompanying drawings, in which:

FIGS. 1 and 2 are diagrams of a meter prover in accordance with the invention, showing the apparatus operating in both the forward and reverse modes, FIG. 3 is a diagram of a plug delivery/receiving station of the meter prover of FIGS. 1 and 2, and FIGS. 4 to 7 are diagrams showing the sequence of operation of the retaining and launching means of the station of FIG. 3.

Referring to FIGS. 1 and 2, the meter prover 2 comprises a calibration conduit 4 of predetermined volume and length, the ends of the conduit 4 being connected to identical plug delivery/receiving stations 1, 1'.

Each of the stations 1, 1' comprises a chamber 8 having a first port 10 for receiving an end of the conduit 4, and a second port 12 connected to a four-way valve 14. The valve 14 receives fluid from a main pipe line having a flow meter (not shown) via a conduit 16, and delivers fluid back to the main pipe line via a conduit 18.

As shown in FIG. 1, in one position of the valve 14, fluid is caused to flow into the second port 12 of the station 1, then out of the station and through the conduit 4, and then into station 1'. The fluid then exits from the second port 12 of station 1' and is passed by the valve 14 back to the main pipe line. FIG. 2 shows that operation of the valve 14 causes the flow through the conduit 4 and end stations 1 and 1' to be reversed.

A spherical plug 20 is movable along the conduit 4 from one end station to the other. The plug is moved by the pressure of the fluid, and the rate of flow is determined by the time taken for the plug to travel the length of the conduit 4, which can be calculated by measuring the interval between signals provided by detectors 22, positioned adjacent the ends of the conduit 4, and close to the stations 1, 1', the signals being produced in response to the passing of the plug.

As will be further described below, when the meter prover is in operation, the plug 20 is retained in an end station until a full flow of fluid is established from that station to the other station. The plug is then launched and a reading taken from the detectors 22. The valve 14 is then operated to reverse the flow, which takes about 8 seconds, during which time the plug is retained against travel through the conduit 4. The plug is then launched again and a further reading taken from the detectors 22, providing accurate measurements for use in calculating the actual rate of flow.

FIG. 3 shows the plug delivery/receiving end station 1, the station 1' being identical. The calibration conduit 4 extends into the first port 10 of the horizontal chamber 8 for a distance equal to its diameter (D). The second port 12 opens onto a side of the chamber 8.

A cage 24 manufactured from a steel conduit is positioned inside the chamber 8 and partly around the end of the conduit 4. The cage 24 is mounted for horizontal sliding motion over the end of the conduit 4 and through a bearing 26 formed by a ring of mild steel. The inner surface of the bearing and the surfaces of the cage 24 are machined for smooth sliding motion.

The cage supports a cylindrical sleeve 28 of the same diameter as the conduit 4 and of axial length ⅓-½ D. The cage 24 is connected by a coupling 30 to a horizontal piston rod 32 extending into a double acting short stroke hydraulic ram 34 located externally of the station 1. This ram 34 is fixed to a removable cover 36 forming one end of the station by means of a support cage 38. A "V" ring seal 40 surrounds the rod 32 to prevent escape of pressurized fluid from the chamber 8.

Application of pressure to the ram 34 causes the piston rod 32 to move the cage 24 between its first position as shown in FIG. 3, in which the sleeve 28 is immediately adjacent the end of the conduit 4 and forms an extension thereof, and a second position in which the sleeve 28 is displaced rightwardly of the position shown in FIG. 3.

The station 1 is operable to receive the plug 20 (see FIGS. 4 to 7) which is delivered from the station 1' at the other end of the conduit 4.

Figure 4:
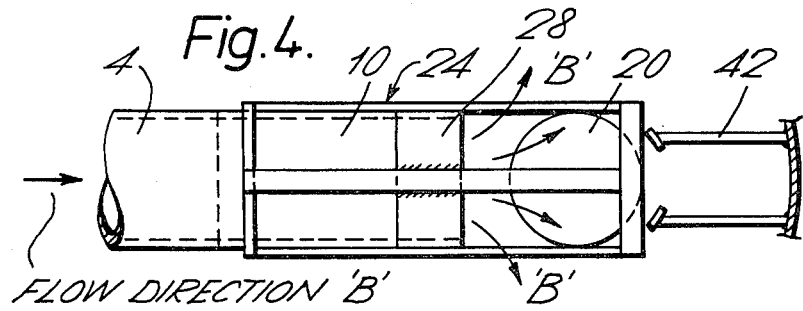

Referring to FIG. 4 the sleeve 28 is in its first position when the station is ready to receive the plug 20. Fluid pushes the plug, which is an interference fit in the conduit 4 and sleeve 28, through the conduit and sleeve and horizontally out of the end thereof. As the plug emerges from the end of the sleeve fluid is allowed to flow in the directions of arrows B outwardly of the cage 24 thus reducing the thrust applied to the plug 20. As the plug 20 is fairly light, the reduction of the thrust on the plug allows the latter to decelerate fairly quickly and in fact the plug comes to rest in a horizontal distance of less than its diameter, thus avoiding any damaging impact of the plug 20.

Figure 5:
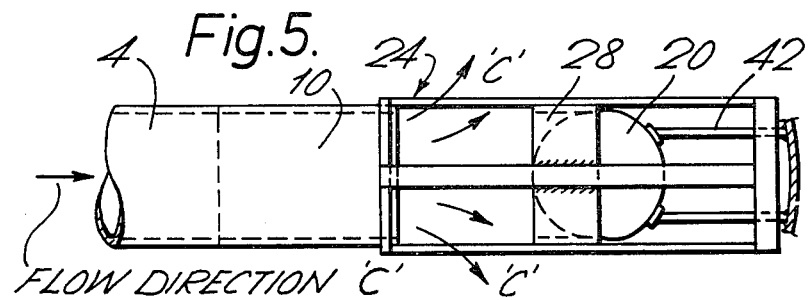

When the plug is to be delivered from the station 1 in the reverse direction, a launch control 44 is operated. This starts the operation of the valve 14 to reverse the flow of fluid and at the same time operates the ram 34 to move the sleeve 28 to its second position, as shown in FIG. 5. In this position, the sleeve 28 is pulled on to the plug 20, the movement of the plug 20 to the right as shown in the Figures being restricted by a cylindrical positioner 42 formed by a cut away conduit section or angle iron fixed to the cover 36, with its end at a prescribed horizontal distance from the end of the conduit 4. The fluid is passed freely outwardly from between the end of the conduit 4 and the sleeve 28 in the directions of arrows C.

Figure 6:
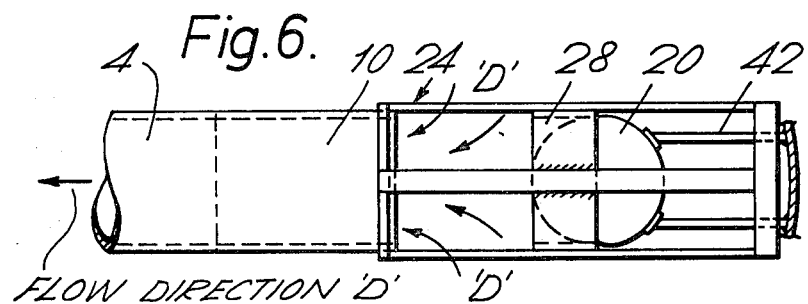
Figure 7:
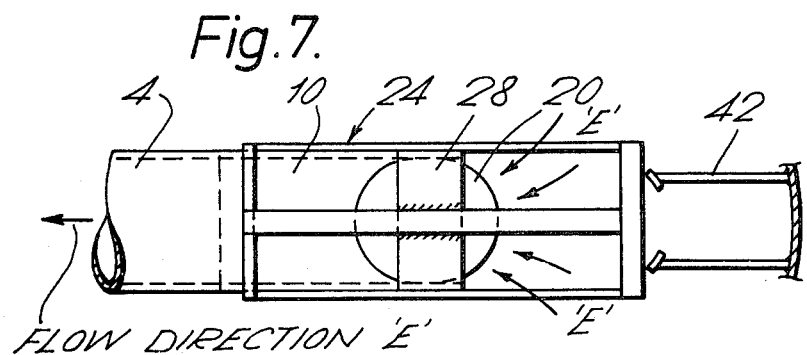

The full reversal of the flow takes in the region of 8 seconds, after which the flow is as shown by arrows D in FIG. 6. During this time the plug 20 is kept in the position shown because the fluid flows freely and exerts little or no pressure on the plug, and therefore cannot overcome the friction between the outer surface of the plug and the inner surface of the sleeve 28.

After the full reverse flow is established, the valve 14 operates a torque switch 46 which sends a signal to a ram control 48. This causes the sleeve 28 to be moved towards its first position, thus closing the gap between the sleeve and the end of the conduit 4. Thus, increasing restriction to flow between the end of the conduit 4 and the sleeve 28 causes increased pressure to be applied to the plug 20 in the direction of arrows E in FIG. 7. Depending upon the conditions of flow, this increased pressure, which tends to overcome the friction between the plug 20 and sleeve 28, causes the plug to be launched into the conduit 4 either during or after the closing of the gap between the conduit 4 and the sleeve 28.

The sleeve 28 is then in a position to receive the plug when next dispatched from the station 1' at the other end of the conduit 4.

In an alternative embodiment, the torque switch 46 is replaced by a time switch which gives a signal at a predetermined time after the valve operation is initiated.

The piston rod 32 is slotted to receive a location bracket 50 which is slidable on a part of the cage 38 and which serves to indicate the axial position of the rod 32 and to prevent rotation of this rod.

To obtain access to the interior of the station 1, the location bracket 50 is removed and the rod 32, access to which is provided by the cage 38, is twisted through 90° which disengages the coupling 30 and allows the quick release cover 36 to be removed. The cage 24 is sized so that the plug 20 can be manually removed therefrom.

The meter prover described has the advantage that the length of calibration conduit between each detector 22 and the adjacent station 1 or 1' is substantially reduced as compared with known provers. The plug can be moved at very high velocities without any damaging impact at the end stations. It has been found that plug speeds of up to 20 ft per sec. can be employed in such a meter prover.

We claim:

1. A meter prover including a u-shaped calibration conduit, a resilient plug that travels through said conduit, and at each end of the calibration conduit a plug delivery/receiving station in which the plug travels horizontally and which includes means for selectively retaining the plug in the station, each plug delivery/receiving station comprising a chamber having a first port at one end which is adapted to be connected to one end of the calibration conduit, and a second port adapted to be connected via valve means to a main pipe line, and a plug cage within the chamber arranged to extend horizontally from at least partly around said one end of said conduit to receive the plug as it emerges from said conduit end and guide it during limited horizontal travel away from said end to a rest position, and said retaining means comprising a sleeve having a cross-section corresponding to that of the conduit and mounted for horizontal movement to and fro in the gap between said conduit end and said plug in said rest position, the plug being an interference fit in the conduit and within the sleeve, actuator means being provided to move the cage and sleeve horizontally and rectilinearly between a first position in which the sleeve forms an extension of the conduit and a second position in which it engages around said plug in said rest position and there is then a space between said conduit and said sleeve, which space is in communication with said second port, whereby when the sleeve is in said first position fluid pressure admitted through said second port is able to force the plug through the sleeve in the conduit and when the sleeve and plug are in said second position the fluid is able to bypass the plug and flow directly into the conduit.

2. A meter prover according to claim 1, wherein the plug is a resilient ball with a diameter substantially equal to that of the conduit and has an overall density substantially the same as that of the fluid with which the meter prover is to be used.

3. A meter prover according to claim 2, wherein the sleeve is secured to the plug cage and both sleeve and cage are movable horizontally together by said actuator means, the rest position of the plug being defined by fixed stop means carried by the chamber end opposite said first port.

4. A meter prover according to claim 3, wherein the conduit end portion projects horizontally into the chamber, and the plug cage is slidably supported at one end by said conduit end and at its other end by a slide bearing in the chamber inward of said end carrying said stop means.

5. A meter prover according to claim 3 or claim 4, wherein the actuator means comprises a ram mounted externally of said chamber on said end carrying said stop means and having a rod extending slidably through said chamber end.

6. A meter prover according to claim 2 or claim 3 or claim 4 wherein the axial length of the sleeve is $\frac{1}{3}$ to $\frac{1}{2}$ of the diameter of the conduit.

7. A meter prover according to claim 2 or claim 3 or claim 4 wherein the actuator means is controlled by a control unit responsive to said valve means.

* * * * *